Patented Feb. 24, 1948

2,436,599

UNITED STATES PATENT OFFICE 2,436,599

BITUMINOUS BONDING COMPOSITION

Chester L. Read and Anthony H. Gleason, Westfield, N. J., assignors, by mesne assignments, to Standard Catalytic Company, a corporation of Delaware No Drawing. Application June 12, 1941,
Serial No. 397,748

2 Claims. (Cl. 106—281)

This invention relates to improvements in the adhesivity of bitumens such as asphalt tar, asphalt cutback and asphalt emulsions to mineral aggregate, metals and other solids.

It has been well established that asphaltic materials derived from petroleum do not satisfactorily coat wet aggregate, particularly that having an acidic character. Also, when such products are used to coat dry aggregate, they may be readily displaced by water if the asphaltic material has not set or hardened on the stone. For this reason, wet aggregates have been dried by means of fired driers or by solar evaporation before mixing with asphalt. Where such mixtures are employed in outdoor construction such as roads, it has been the customary practice to apply these mixtures only during dry weather in order to eliminate any possibility of stripping of the asphalt from the stone by water displacement.

It has been found by various investigators that certain materials may be added to asphalt which not only improve their ability to coat wet aggregate, but also greatly increase their resistance to stripping by water displacement. Oil soluble soaps derived from high molecular weight organic soaps were the first compounds to be given serious consideration for this purpose. More recently, it has been found that mono amines having at least 1 lipophilic radical attached to the nitrogen by a carbon-nitrogen bond are appreciably more effective than the metallic soaps.

A disadvantage in the use of mono amines has been that the mono amines are substantially insoluble in asphalt and the organic solvents generally used in cutback asphalts, and therefore the proper contact of the mono amines and the mineral aggregate were not at all times obtained.

It is an object of this invention to provide amines that may be more easily handled and more evenly contacted with the mineral aggregate. Another object of this invention is to provide an amine that is more effective than the mono amines that have been used heretofore.

According to this invention it has been found that di- or polyamines are appreciably more effective than the corresponding mono amines. This improvement is illustrated in the following table:

*Adhesive tests of Venezuelan cutback asphalt*

| Agent Used | Percent on Asphalt | Dry Stone | | Wet Stone (2% $H_2O$) | |
|---|---|---|---|---|---|
| | | Percent Coated in Mixing Operation | Percent Coated After 4 hr. Cure water displacement | Percent Coated in Mixing Operation | Percent Coated after 4 hr. Cure Followed by water Displacement |
| None | | 100 | 3 | 80 | 3 |
| n-Hexylamine | 0.4 | 100 | 5 | 90 | 3 |
| 1,6-hexanediamine | 0.4 | 100 | 10 | 90 | 5 |
| 1-amino-decane | 0.4 | 100 | 90 | 95 | 80 |
| 1,10-diamino-decane | 0.4 | 100 | 100 | 100 | 100 |
| 1 amino-hexadecane | 0.2 | 100 | 95 | 90 | 75 |
| 1,16-diamino-hexadecane | 0.2 | 100 | 100 | 100 | 95 |

These results show that the alkyl diamine having 10 carbon atoms to the molecule improved the adhesivity of the asphalt to the mineral aggregate when 0.1 to 1% was added to the asphalt. Diamines having 8 carbon atoms to the molecule were also found to be effective. Therefore a di- or polyamine in which at least 1 carbon chain of 8 or more carbon atoms is attached to at least one nitrogen by means of a carbon to nitrogen bond greatly improves the adhesivity of the asphalt to a mineral aggregate.

We claim:

1. A bituminous bonding composition comprising solid substances, an asphalt and 0.1 to 1% by weight of 1,10 diamino decane.

2. The process of manufacturing a bituminous bonding composition for coating mineral aggregate which comprises incorporating from 0.1–1% by weight of 1,10-diamino decane with 99–99.9% by weight of an asphalt.

CHESTER L. READ.
ANTHONY H. GLEASON.

REFERENCES CITED

The following references are of record in the file of this patent:

UNITED STATES PATENTS

| Number | Name | Date |
|---|---|---|
| 2,191,295 | Dohse et al. | Feb. 20, 1940 |
| 2,232,598 | Farlow | Feb. 18, 1941 |

FOREIGN PATENTS

| Number | Country | Date |
|---|---|---|
| 847,829 | France | July 10, 1939 |